United States Patent
Browne et al.

(10) Patent No.: US 10,645,954 B2
(45) Date of Patent: May 12, 2020

(54) BEVERAGE AND FOOD PRODUCTION USING GREEK YOGURT ACID WHEY

(71) Applicant: PepsiCo, Inc., Purchase, NY (US)

(72) Inventors: Damian Browne, Valhalla, NY (US); Yvonne Collins, Cork (IE); Margaret Dohnalek, Purchase, NY (US); Dave McDonagh, Cork (IE); Heidi Kleinbach-Sauter, Cork (IE); Kyle Shadix, Valhalla, NY (US); Siow Ying Tan, Valhalla, NY (US)

(73) Assignee: PepsiCo, Inc., Purchase, NY (US)

( * ) Notice: Subject to any disclaimer, the term of this patent is extended or adjusted under 35 U.S.C. 154(b) by 407 days.

(21) Appl. No.: 15/342,353

(22) Filed: Nov. 3, 2016

(65) Prior Publication Data
US 2018/0116250 A1 May 3, 2018

(51) Int. Cl.
| | | |
|---|---|---|
| *A23C 9/123* | (2006.01) | |
| *A23L 2/38* | (2006.01) | |
| *A23C 21/02* | (2006.01) | |
| *A23L 2/68* | (2006.01) | |
| *A23L 2/66* | (2006.01) | |

(52) U.S. Cl.
CPC ............... *A23L 2/382* (2013.01); *A23C 9/123* (2013.01); *A23C 21/023* (2013.01); *A23C 21/026* (2013.01); *A23L 2/66* (2013.01); *A23L 2/68* (2013.01); *A23C 2210/208* (2013.01); *A23C 2260/05* (2013.01)

(58) Field of Classification Search
CPC ... A23L 2/382; A23L 2/66; A23L 2/68; A23C 9/123; A23C 21/023; A23C 21/026; A23C 2210/208; A23C 2260/05

USPC .......... 426/34, 41, 490, 491, 580, 583, 590
See application file for complete search history.

(56) References Cited

U.S. PATENT DOCUMENTS

| | | |
|---|---|---|
| 2015/0056358 A1 | 2/2015 | Keller |
| 2015/0118360 A1 | 4/2015 | Ward et al. |
| 2015/0173386 A1 | 6/2015 | Borcherding et al. |
| 2016/0073653 A1 | 3/2016 | Bell |

OTHER PUBLICATIONS https://www.dairyreporter.com/Article/2014/12/05/Patent-watch-General-Mills-tackles-Greek-yogurt-acid-whey.*
Holsinger et al., Whey Beverages: A Review, J. Dairy Sci., vol. 5, No. 8, 1974, pp. 849-859.*
Ramos et al., Whey and Whey Powders: Production and Uses, The Encyclopedia of Food and Health, (2016), vol. 5, pp. 498-505.*

* cited by examiner

*Primary Examiner* — Leslie A Wong
(74) *Attorney, Agent, or Firm* — Barnes & Thornburg LLP; G. Peter Nichols

(57) ABSTRACT

A method of producing a beverage base or a component for a beverage or a food, providing Greek yogurt acid whey which has been obtained by separating the whey from Greek yogurt during a manufacturing process for the Greek yogurt; removing from the acid whey particulate material having a particle size of greater than 10 μm; filtering the whey, directly or indirectly thus obtained to remove from the whey any bacteria and germinated bacterial spores therein having a molecular mass of at least 10,000 Daltons, the filtering being through a filter having a pore size of no greater than 1 μm; and filtering the whey, directly or indirectly thus obtained to remove from the whey any enzymes therein having a molecular mass of at least 1,000 Daltons, the filtering being through a filter having a pore size of no greater than 0.1 μm.

34 Claims, 8 Drawing Sheets

BEVERAGE AND FOOD PRODUCTION USING GREEK YOGURT ACID WHEY

BACKGROUND OF THE INVENTION

Technical Field

The present invention relates to method of producing a beverage base or a component for a beverage or a food, using Greek yogurt acid whey.

Description of Related Art

Greek yogurt acid whey is obtained by separating the whey from Greek yogurt during a manufacturing process for the Greek yogurt. In particular, Greek yogurt acid whey is produced as a by-product or waste stream during manufacture of Greek Yogurt by straining or centrifugation. The resultant whey stream differs in composition from traditional cheese or 'sweet whey' being lower in pH (typically <4.5), higher in dairy mineral content (approximately 20 wt % higher), lower in lactose (up to 4.5 wt % lower) and contains negligible protein (up to 0.36 wt % protein).

Recently, the US Greek yogurt market volume has been estimated at over one billion pounds annually (Dairy Research Institute, 2014), resulting in an annual production in the US alone of approximately 2.7 billion pounds of Greek yogurt acid whey. Therefore, Greek yogurt acid whey is produced in high volume but has a low commercial value, currently approximately US$0.1/lb. Consequently, there is a need in the art for the identification of an economic solution for commercially valuable and technically viable uses of this low value by-product or waste stream. Such a solution is a priority for high volume Greek yogurt manufacturers.

Greek yogurt acid whey currently poses three particular challenges for yogurt manufacturers, namely: 1) there is a significant economic cost of managing and disposing the by-product as a waste stream; 2) there are processing and technical challenges associated with treatment of the Greek yogurt acid whey for subsequent downstream use, due to the low solids content, high mineral acid content and high mineral content leading to high costs of processing and equipment fouling; and 3) the environmental impact associated with the disposal of high volumes of hazardous waste.

Some opportunities which have been proposed for the utilization of Greek yogurt acid whey include: 1) the direct use of the Greek yogurt acid whey in powder or concentrate form as a salt enhancer/replacement or filler; 2) the use of the Greek yogurt acid whey as a source of lactose; 3) the conversion or hydrolysis of lactose in the Greek yogurt acid whey; 4) the bio-conversion of Greek yogurt acid whey; and 5) the use of Greek yogurt acid whey, which contains minerals, oligosaccharides, etc., to permeate mining (Dairy Research Institute, 2014), 5) the use of Greek yogurt acid whey in combination with acid-stable dairy protein resulting in a composition more similar to sweet whey. These opportunities nevertheless pose challenges associated with the processing difficulties outlined above.

A number of patent specifications have disclosed the processing of Greek yogurt acid whey. US-A-2016/0073653 discloses a nutritious beverage formed from fluid acid whey. A fermentation free method is employed. The liquid acid whey is processed according to a variety of different process flows. In each process flow a food grade acidulant, a pH neutraliser and/or an enzyme are added to lower the pH of the fluid acid whey. The fluid acid whey may be subjected to an initial ultrafiltration or evaporation prior to adding the pH lowering additives. The lower pH liquid is subjected to pasteurisation prior to cooling and bottling. Alternatively a powder is formed.

US-A-2015/0118360 discloses a fermented flavouring system from Greek yoghurt processing. The Greek acid whey is heat treated, spray dried or concentrated to form a paste or gel.

US-A-2015/0173386 discloses acid whey-based compositions in which the acid whey is added to various foodstuffs.

US-A-2015/0056358 discloses a process for drying acid whey.

There is still a need in the art for an improved method of producing an ambient temperature stable beverage base or beverage component using Greek yogurt acid whey which does not require pasteurisation or formation of a powder.

There is still a need in the art for an improved method of producing a beverage base, typically an ambient temperature stable beverage base, using Greek yogurt acid whey which can employ clean-up and standardisation processes for treating the Greek yogurt acid whey which, generically, are typically used in the dairy products industry, or are readily integrated into processes used in the dairy products industry. In particular, there is a need for a process that can readily be incorporated as an added unit in an existing dairy products production facility.

There is still a need in the art for an improved method of producing a beverage base using Greek yogurt acid whey which retains the positive nutritional ingredients of the Greek yogurt acid whey, such as minerals, and fatty acids, and retains the natural status of the Greek yogurt acid whey.

There is still a need in the art for an improved method of producing a beverage base using Greek yogurt acid whey which can accommodate a non-standard or varying input of the Greek yogurt acid whey to be processed.

SUMMARY OF THE INVENTION

The present invention aims to provide a technically and commercially viable use for Greek yogurt acid whey which overcomes at least some of the problems and/or meets at least some of the needs as discussed above.

In particular, the present invention aims to provide methods for the clean-up, standardisation and stabilization of Greek yogurt acid whey to produce a shelf-stable mineral-rich dairy base for beverage applications, in particular for a ready-to-drink beverage base. The beverage base may be shelf-stable under ambient (25° C. or below) storage conditions. The beverage base may be in concentrated form or alternatively may have not been concentrated as compared to the original Greek yogurt acid whey. These methods may alternatively provide a beverage or food component for incorporation into a beverage or food product.

Accordingly, the present invention provides a method of producing a beverage base or a component for a beverage or a food, the method comprising the steps of:

providing Greek yogurt acid whey which has been obtained by separating the whey from Greek yogurt during a manufacturing process for the Greek yogurt;

removing from the acid whey particulate material having a particle size of greater than 10 µm;

filtering the whey, directly or indirectly obtained from step b, to remove from the whey any bacteria and germinated bacterial spores therein having a molecular mass of at least 10,000 Daltons, the filtering being through a filter having a pore size of no greater than 1 µm; and filtering the whey, directly or indirectly obtained from step c, to remove from the whey any enzymes therein having a molecular mass of at least 1,000 Daltons, the filtering being through a filter having a pore size of no greater than 0.1 µm.

In some embodiments of the present invention, the Greek yogurt acid whey provided in step a is a full fat Greek yogurt acid whey and the beverage base is turbid. Typically, the full fat Greek yogurt acid whey has a fat concentration of from 0.05 to 0.1 wt % based on the total weight of the Greek yogurt acid whey.

In other embodiments of the present invention, the Greek yogurt acid whey provided in step a is a reduced-fat or non-fat Greek yogurt acid whey and the beverage base is clear. Typically, the reduced-fat or non-fat Greek yogurt acid whey has a fat concentration of from 0 to 0.04 wt %, or from greater than 0 to up to 0.04 wt %, based on the total weight of the Greek yogurt acid whey.

In some embodiments of the present invention, step b is carried out by filtering the whey through a filter.

In other embodiments of the present invention, step b is carried out by a separating the acid whey into a first liquid phase and a second solid phase comprising the particulate material, the first phase having a different density from the second phase, so that a density difference between the phases causes phase separation, and removing the second phase from the first phase. Optionally, step b is carried out by a centrifuge or a bactofuge.

In some embodiments of the present invention, the method further comprises the step, after step b and before step c, of step e: heat treating the whey to germinate bacterial spores in the whey, and wherein the germinated bacterial spores are removed by filtration in step c. Typically, the heat treatment heats the whey to a temperature of from 25 to 65° C. for a period of from 1 to 10 seconds. Optionally, the heat treatment additionally pasteurises the whey.

In some embodiments of the present invention, the method further comprises the step, after step b and before step c, of step f: fermenting the whey, the fermented whey having a pH of less than 4.0, optionally wherein the whey has a pH prior to fermentation within the range of from 4.2 to 4.5. Preferably, the fermenting step f is after heat treating step e. Typically, in the fermenting step f a yogurt and/or cheese culture is added to the whey as a fermentation agent. Most typically, in the fermenting step f the fermentation agent comprises at least one bacterium selected from *lactobacillus* and *Streptococcus thermophilus*.

In some embodiments of the present invention, the method further comprises the step, after step b and before step c, of step g: enzymatically treating the whey with a lactaze enzyme to hydrolyse lactose to glucose and galactose. Typically, the enzymatic treatment step g is carried out at temperature of from 21 to 45° C.

In some embodiments of the present invention, the method is for forming a beverage base having a total solids content of from 5.5 to 6 wt % based on the total weight of the beverage base. The method comprises the steps of: providing Greek yogurt acid whey which has been obtained by separating the whey from Greek yogurt during a manufacturing process for the Greek yogurt; then removing from the acid whey particulate material having a particle size of greater than 10 µm; then heat treating the whey to germinate bacterial spores in the whey; then fermenting the whey, the fermented whey having a pH of less than 4.0, optionally wherein the whey has a pH prior to fermentation within the range of from 4.2 to 4.5; then enzymatically treating the whey with a lactaze enzyme to hydrolyse lactose to glucose and galactose; then filtering the whey to remove from the whey any bacteria and germinated bacterial spores therein having a molecular mass of at least 10,000 Daltons, the germinated bacterial spores being produced in step e, the filtering being through a filter having a pore size of no greater than 1 µm; and then filtering the whey to remove from the whey any enzymes therein having a molecular mass of at least 1,000 Daltons, the filtering being through a filter having a pore size of no greater than 0.1 µm.

In some embodiments of the present invention, the method further comprises the step h, after step b, of concentrating the whey to a total solids content of from 20 to 40 wt %, optionally from 25 to 35 wt %, further optionally about 30 wt %, based on the total weight of the whey. Step h may comprise a reverse osmosis treatment through a semi-permeable membrane. Typically, the semi-permeable membrane has a pore size of less than 0.001 µm.

In some embodiments of the present invention, the method is for forming a beverage base having a total solids content of from 20 to 40 wt %, optionally from 25 to 35 wt %, further optionally about 30 wt %, based on the total weight of the beverage base, the method comprising the steps of: providing Greek yogurt acid whey which has been obtained by separating the whey from Greek yogurt during a manufacturing process for the Greek yogurt; then removing from the acid whey particulate material having a particle size of greater than 10 µm; then heat treating the whey to germinate bacterial spores in the whey; then concentrating the whey to a total solids content of from 20 to 40 wt % based on the total weight of the whey by a reverse osmosis treatment through a semi-permeable membrane; then fermenting the whey, the fermented whey having a pH of less than 4.0, optionally wherein the whey has a pH prior to fermentation within the range of from 4.2 to 4.5; then enzymatically treating the whey with a lactaze enzyme to hydrolyse lactose to glucose galactose; then filtering the whey to remove from the whey any bacteria and germinated bacterial spores therein having a molecular mass of at least 10,000 Daltons, the germinated bacterial spores being produced in step e, the filtering being through a filter having a pore size of no greater than 1 µm; and then filtering the whey to remove from the whey any enzymes therein having a molecular mass of at least 1,000 Daltons, the filtering being through a filter having a pore size of no greater than 0.1 µm.

In some embodiments of the present invention, the step h, of concentrating the whey to a total solids content of from 20 to 40 wt % based on the total weight of the whey, is after step d. Again, the whey may be concentrated to a total solids content of from 25 to 35 wt %, optionally about 30 wt %, based on the total weight of the whey. Typically, step h comprises an evaporation step. The evaporation step is typically carried out by mechanical vapour recompression at a temperature of up to 75° C.

In some embodiments of the present invention, the method is for forming a beverage base having a total solids content of from 20 to 40 wt %, optionally from 25 to 35 wt %, further optionally about 30 wt %, based on the total weight of the beverage base, the method comprising the steps of: providing Greek yogurt acid whey which has been obtained by separating the whey from Greek yogurt during a manufacturing process for the Greek yogurt; then removing from the acid whey particulate material having a particle size of greater than 10 µm by filtering and/or centrifugation; then filtering the whey to remove from the whey any bacteria and germinated bacterial spores therein having a molecular mass of at least 10,000 Daltons, the filtering being through a filter having a pore size of no greater than 1 µm; then filtering the whey to remove from the whey any enzymes therein having a molecular mass of at least 1,000 Daltons, the filtering being through a filter having a pore size of no greater than 0.1 µm; and then concentrating the whey by evaporation to a total solids content of from 20 to 40 wt %, optionally from 25 to 35 wt %, further optionally about 30 wt %, based on the total weight of the beverage.

The method may further comprise the step i, after step d, of treating the filtered whey by ultraviolet radiation within a wavelength range of from 220 to 290 nm.

The preferred embodiments of the present invention can provide a method of producing a beverage base or a component for a beverage or food using Greek yogurt acid whey as a starting ingredient which can add commercial value to a current low value waste stream.

The method employs particular steps which, together with selection of an in-feed stream of Greek yogurt acid whey, can clean-up, standardise and stabilize, with or without a whey concentration step, to produce a new shelf-stable, ambient liquid, which is rich in dairy minerals for use as a base in ready-to-drink beverage applications. Particularly suitable beverage applications include those delivering nutritional benefits, for example a beverage high in dairy calcium, and hydration benefits, for example a beverage high in dairy potassium.

The preferred embodiments of the present invention can provide a method of producing an ambient temperature stable beverage base using Greek yogurt acid whey which does not require pasteurisation or formation of a powder.

The preferred embodiments of the present invention can provide a method of producing a beverage base, typically an ambient temperature stable beverage base, using Greek yogurt acid whey which can employ clean-up and standardisation processes for treating the Greek yogurt acid whey which, generically, are typically used in the dairy products industry, or are readily integrated into processes used in the dairy products industry. In particular, the process can readily be incorporated as an added unit in an existing dairy products production facility.

The preferred embodiments of the present invention can provide a method of producing a beverage or a component for a beverage or food using Greek yogurt acid whey as a starting ingredient which retains the positive nutritional ingredients of the Greek yogurt acid whey, such as minerals, and fatty acids, and retains the natural status of the Greek yogurt acid whey.

The preferred embodiments of the present invention can provide a method of producing a beverage base or a component for a beverage or food using Greek yogurt acid whey as a starting ingredient which can accommodate a non-standard or varying input of the Greek yogurt acid whey to be processed.

BRIEF DESCRIPTION OF THE DRAWINGS

Embodiments of the present invention will now be described by way of example only with reference to the accompanying drawings, in which.

DETAILED DESCRIPTION OF THE PREFERRED EMBODIMENTS

Figure 1:
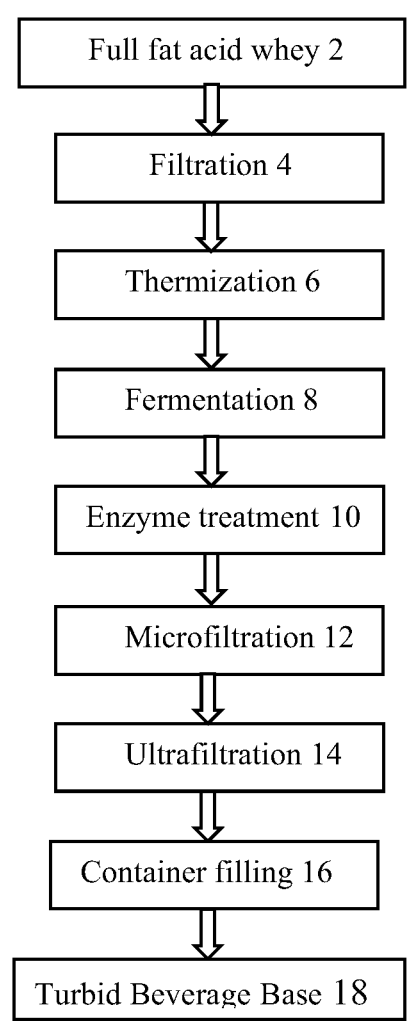
FIG. 1 is a process flow of a method of producing a beverage base or a component for a beverage in accordance with a first embodiment of the present invention.

In summary, the preferred embodiments of the present invention provide a source of Greek yogurt acid whey source which is value-added as a result of following a specified treatment protocol using a specified configuration of dairy unit operations.

The in-feed Greek yogurt acid whey is selected to meet a finished (stabilized and standardized) Greek yogurt acid whey specification based on parameters including yogurt composition (full fat, non-fat), yogurt separation process (membrane or separator) and whey turbidity.

The in-feed Greek yogurt acid whey for use in the method of the present invention typically has the composition shown in Table 1.

TABLE 1

| Total Solids | 5.5-6.0 wt % |
| Fat | <0.1 wt % |
| Crude Protein | <0.5 wt % |
| Lactose | 2.6-3.8 wt % |
| Galactose | 0.5-0.7 wt % |
| Ash | 0.50-0.55 wt % |
| pH | 4.2-4.5 |
| Calcium | >1,200 ppm by weight |
| Potassium | >1,600 ppm by weight |
| Phosphorous | >550 ppm by weight |

The Greek yogurt acid whey in-feed is then treated to remove particulates by processes including a filter sock, fines separator, and/or a centrifuge/bactofuge, with the objective of removing visual particulates while maintaining positive nutrients of interest (lactose, peptides, minerals, polyphenols).

Following particulate removal, bacteria and germinated spores are removed by microfiltration, and in particular cases of high microbiological load, by a combination of microfiltration and full centrifugation. The Greek yogurt acid whey feed is then treated by ultrafiltration to remove residual enzymes. These filtration process steps are also used to standardise the mineral content to meet the finished Greek yogurt acid whey ingredient specification.

The above process configuration results in a liquid, shelf-stable liquid form of Greek yogurt acid whey which may be packed in a bulk container (e.g. an IBA-tainer) or large volume (e.g. 20-Gallon) high density polyethylene (HDPE) containers for onwards supply to a beverage manufacturing site in an ambient temperature supply chain. The resultant beverage ingredient has a shelf-life of 6 months.

Two particular examples of a beverage composition, or base or component of a beverage composition, produced in accordance with the method of the present invention, are shown in Table 2.

TABLE 2

| | Non-Concentrated | Concentrated |
|---|---|---|
| Taste, Odour and Appearance | Tart, sour, lactic acid. Clear liquid or turbid liquid (dependant on fat content of in-feed Greek yogurt acid whey) | Tart, sour, lactic acid. Clear liquid or turbid liquid (dependant on fat content of in-feed Greek yogurt acid whey) |
| Total Solids | 5.5-6.0 wt % | 30 wt % |
| Fat | <0.1 wt % | <0.6 wt % |
| Crude Protein | <0.4 wt % | <2.5 wt % |
| Lactose | 2.6-3.8 wt % | 15-25 wt % |
| Ash | 0.50-0.55 wt % | 3.0-3.5 wt % |
| pH | <4.0 | <4.0 |
| Calcium | >1,000 ppm by weight | >6,000 ppm by weight |
| Potassium | >1,500 ppm by weight | >9,000 ppm by weight |
| Phosphorous | >550 ppm by weight | >3,30 ppm by weight |

Although the present invention has particular application to the production of beverages or beverage bases or components for beverages, the product of the method of the present invention may be used as a component for other food applications. For example, the processed Greek yogurt acid whey may be incorporated as a component into puddings and gels with a gum concentration to achieving semi-solid to solid compositions, or into savory foods as a salt (sodium) reduction additive.

Referring to FIG. 1, there is shown a process flow of a method of producing a beverage base or a component for a beverage in accordance with a first embodiment of the present invention.

In a first step 2 there is provided Greek yogurt acid whey which has been obtained by separating the whey from Greek yogurt during a manufacturing process for the Greek yogurt. In this embodiments of the present invention, the Greek yogurt acid whey is a full fat Greek yogurt acid whey and the resultant beverage or beverage component is turbid or cloudy. Typically, the full fat Greek yogurt acid whey has a fat concentration of from 0.05 to 0.1 wt % based on the total weight of the Greek yogurt acid whey.

In a second step 4, particulate material having a particle size of greater than 10 μm is removed from the Greek yogurt acid whey. In this embodiment, step b is carried out by filtering the whey through a filter, for example a filter sock which is known in the dairy industry as a filter. The filtering step 4 removes from the whey visible particulates carried over from the yogurt manufacturing process, e.g. yogurt curd pieces.

In a third step 6, the whey is heat treated, also known as a thermization, to germinate residual bacterial spores in the whey. The germinated bacterial spores are later removed by downstream microfiltration, as described below, or centrifugation. Typically, the heat treatment heats the whey to a temperature of from 25 to 65° C. for a period of from 1 to 10 seconds. Optionally, the heat treatment additionally pasteurises the whey.

In a fourth step 8 the whey is fermented. The fermented whey has a pH of less than 4.0. This compares to a typical initial pH of the Greek yogurt acid whey of from 4.2 to 4.5.

Typically, in the fermenting step a yogurt and/or cheese culture, as traditionally used for yogurt and cheese manufacture, is added to the whey as a fermentation agent. The fermentation agent typically comprises at least one bacterium selected from *lactobacillus* and *Streptococcus thermophilus*. The fermentation is carried out to reduce the pH to below 4.0, thereby improving the microbiological stability of the resultant beverage product in a supply chain in which the beverage is stored and shipped at ambient temperature. The fermentation can also remove the requirement for a downstream process to microbiologically stabilize the beverage, for example a UV-treatment. The fermentation also tends to inhibit secondary Maillard browning reactions which may occur in downstream heat treatments.

In a fifth step 10, the whey is enzymatically treated with a lactaze enzyme to hydrolyse lactose in the whey to glucose and galactose. Typically, the enzymatic treatment step is carried out at temperature of from 21 to 45° C. The hydrolysis of lactose to glucose and galactose facilitates downstream processing, in particular by mitigating lactose crystallization, and by increasing sweetness of the Greek acid whey composition, allowing for reduced sugar/sweetener addition in beverage applications.

In a sixth step 12, the whey is further filtered to remove from the whey any bacteria and germinated bacterial spores therein having a molecular mass of at least 10,000 Daltons. The filtering is through a filter having a pore size of no greater than 1 μm, to achieve by microfiltration the removal of bacteria and germinated spores. The use of a microfiltration step 12 can avoid the need for a centrifuge, which is less preferred in the manufacturing process due to additional cost and complexity.

In a seventh step 14, the whey is filtered to remove from the whey any enzymes therein having a molecular mass of at least 1,000 Daltons, the filtering being through a filter having a pore size of no greater than 0.1 μm. This ultrafiltration step 14 removes residual enzymes and standardises the mineral composition of the resultant filtered whey. The ultrafiltration step 14 typically uses a polymeric filter or a ceramic filter, as known in the art.

The resultant treated Greek yogurt acid whey composition is then filled into a suitable bulk container for storage and transportation, as shown by eighth step 16.

Finally, in a ninth step 18 the composition is formulated into a beverage base. The composition is a beverage base or beverage component having a cloudy or turbid appearance and a solids content derived from the Greek yogurt acid whey of from 5.5 to 6 wt % based on the weight of the composition. The composition can be combined with other ingredients to make a consumable composition.

Figure 2:
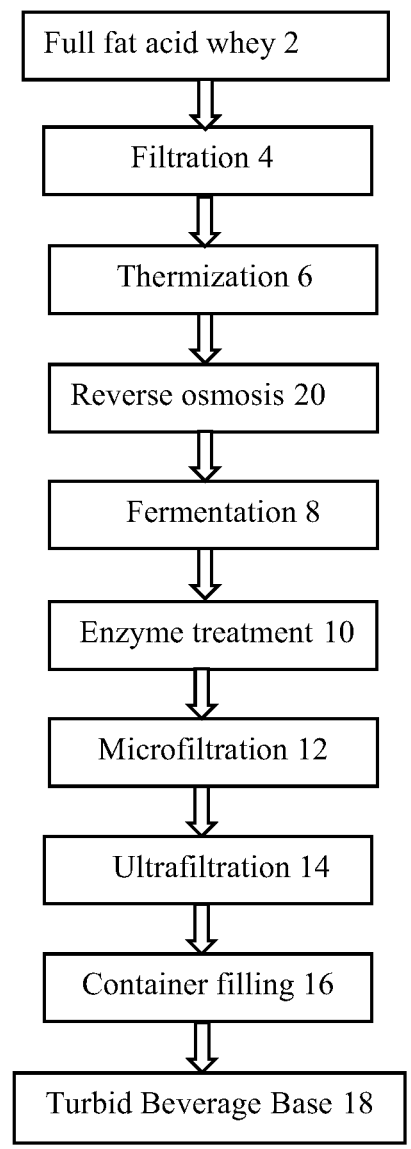
FIG. 2 is a process flow of a method of producing a beverage base or a component for a beverage in accordance with a second embodiment of the present invention.

Referring to FIG. 2, there is shown a process flow of a method of producing a beverage base or a component for a beverage in accordance with a second embodiment of the present invention.

This method is similar to that of FIG. 1, and the same steps are indicated by the same reference numerals, but the method produces a composition with a higher solids content as a result of additionally employing a concentration step in the process flow.

In particular, after the heat treatment 6, and before the fermentation treatment 8, there is additionally provided a step 20 of concentrating the whey to a total solids content of from 20 to 40 wt %, optionally from 25 to 35 wt %, further optionally about 30 wt %, based on the total weight of the whey. The concentrating step 20 may comprise a reverse osmosis treatment through a semi-permeable membrane. Typically, the semi-permeable membrane has a pore size of less than 0.001 μm. In the reverse osmosis, the pore size and operating pressure can readily be selected by the skilled person to achieve a desired level of concentration and retention of mineral ions in the finished beverage application. The reverse osmosis can eliminate any downstream concentration step, for example by evaporation, for the manufacture of beverages with higher solids content than present in the original whey, for example an initial total solids content of 5.5 to 6 wt %.

The composition is a beverage base or beverage component having a cloudy or turbid appearance and a solids content derived from the Greek yogurt acid whey of most typically about 30 wt % based on the weight of the composition. The composition can be combined with other ingredients to make a consumable composition.

Figure 3:
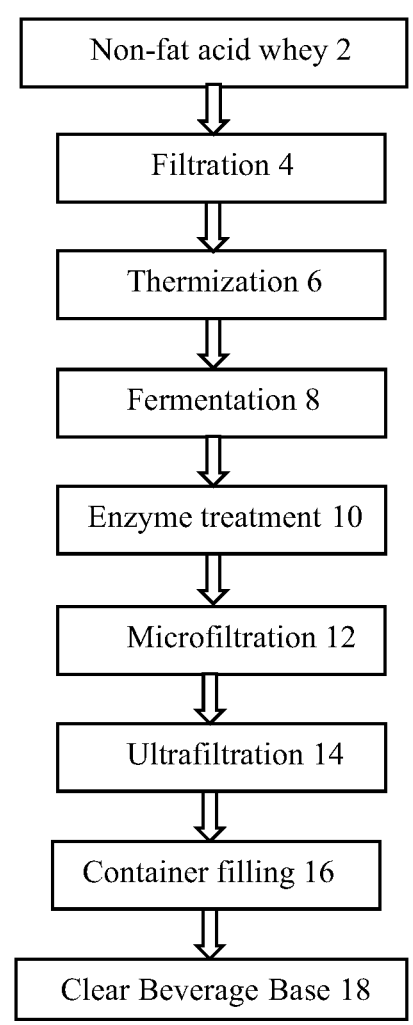
FIG. 3 is a process flow of a method of producing a beverage base or a component for a beverage in accordance with a third embodiment of the present invention.

Referring to FIG. 3, there is shown a process flow of a method of producing a beverage base or a component for a beverage in accordance with a third embodiment of the present invention.

This method is similar to that of FIG. 1, and the same steps are indicated by the same reference numerals, but the method produces a clear beverage base composition as a result of initially providing a reduced-fat or non-fat Greek yogurt acid whey. Typically, the reduced-fat or non-fat Greek yogurt acid whey has a fat concentration of from 0% to 0.04 wt % based on the total weight of the Greek yogurt acid whey.

The composition is a beverage base or beverage component having a clear appearance and a solids content derived from the Greek yogurt acid whey of from 5.5 to 6 wt % based on the weight of the composition. The composition can be combined with other ingredients to make a consumable composition.

Figure 4:
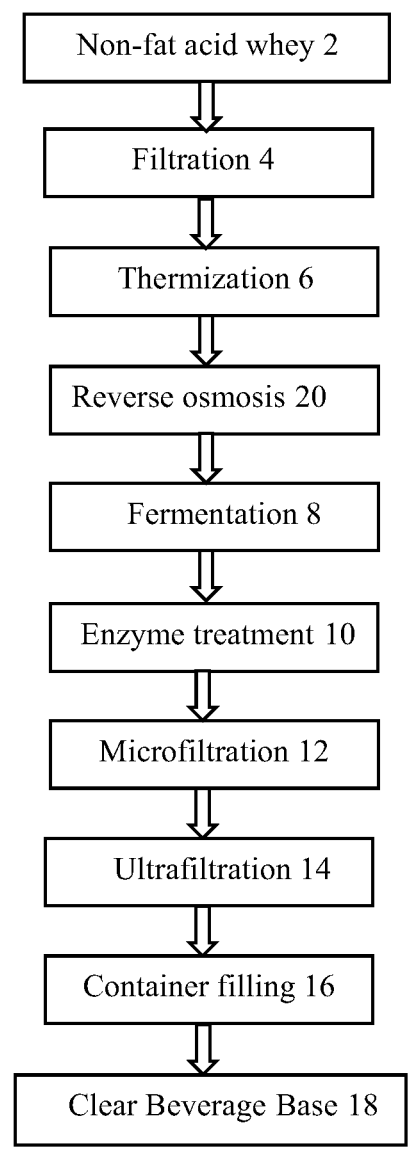
FIG. 4 is a process flow of a method of producing a beverage base or a component for a beverage in accordance with a fourth embodiment of the present invention.

Referring to FIG. 4, there is shown a process flow of a method of producing a beverage base or a component for a beverage in accordance with a fourth embodiment of the present invention.

This method is similar to that of FIG. 2, and the same steps are indicated by the same reference numerals, but the method produces a clear beverage base composition as a result of initially providing a reduced-fat or non-fat Greek yogurt acid whey.

The composition is a beverage base or beverage component having a clear appearance and a solids content derived from the Greek yogurt acid whey of most typically about 30 wt % based on the weight of the composition. The composition can be combined with other ingredients to make a consumable composition.

Figure 5:
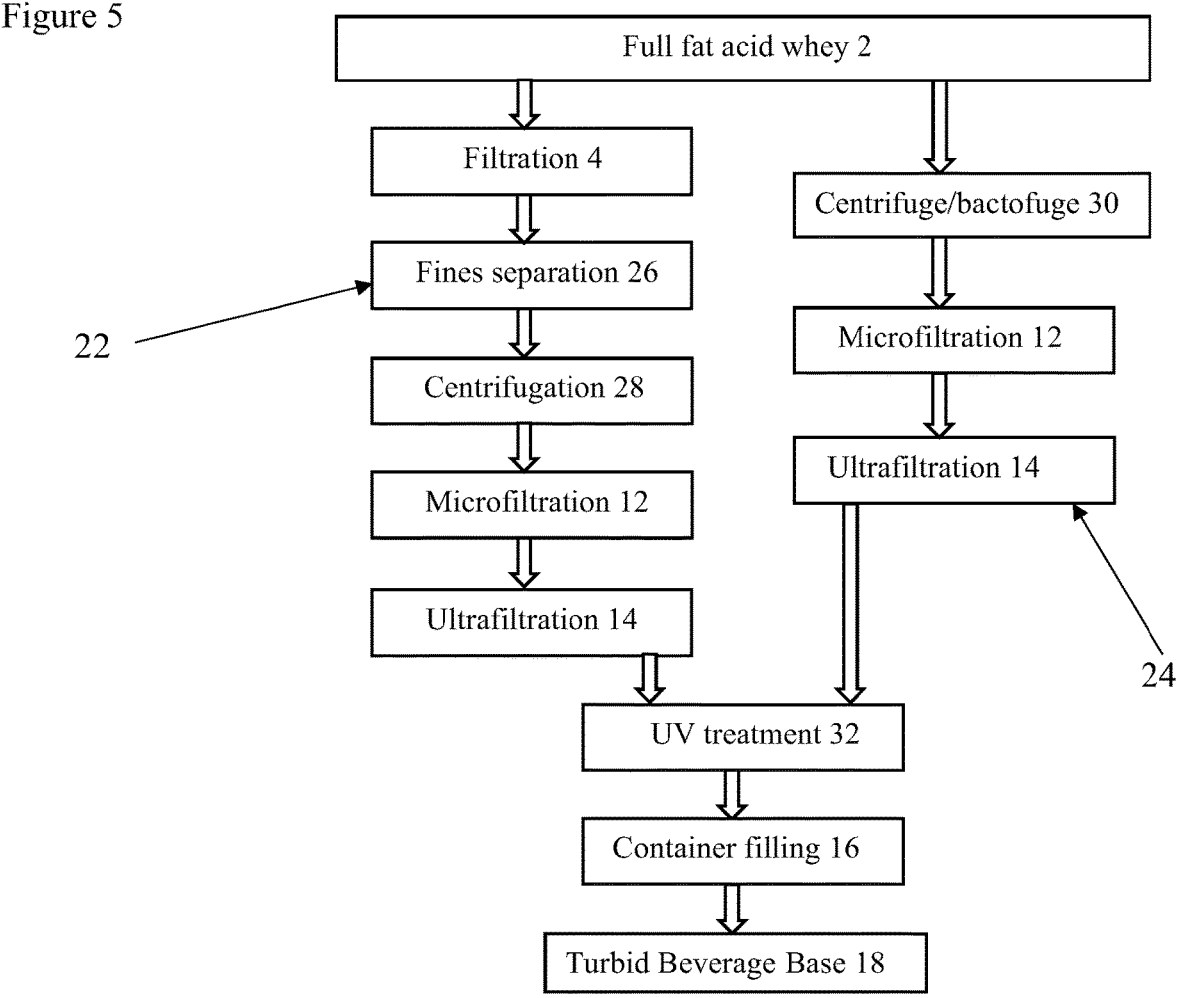
FIG. 5 is a process flow of a method of producing a beverage base or a component for a beverage in accordance with a fifth embodiment of the present invention.

Referring to FIG. 5, there is shown a process flow of a method of producing a beverage base or a component for a beverage in accordance with a fifth embodiment of the present invention.

This method is a modification of the methods of FIGS. 1 to 4, and the same steps are indicated by the same reference numerals. As for the method of FIG. 1, the method produces a cloudy or turbid beverage composition as a result of initially providing a full-fat Greek yogurt acid whey. Also, as for the method of FIG. 1, the whey is not subjected to a concentration step, and the resultant composition is a beverage base or beverage component having a solids content derived from the Greek yogurt acid whey of from 5.5 to 6 wt % based on the weight of the composition. The composition can be combined with other ingredients to make a consumable composition.

In the embodiment of FIG. 5, the Greek yogurt acid whey is processed by either or both of two process streams 22, 24. When both process streams 22, 24 are employed, part of the Greek yogurt acid whey is processed by a respective one of the two process streams 22, 24, and then the resultant products are combined and further treated to produce a final beverage base or beverage component.

The left-hand process stream 22 in FIG. 5 employs a filtering step 4 as described above. Thereafter, there is a fines separation step 26 and a subsequent optional centrifugation step 28.

The fines separation step 26 removes visible particulates e.g. yogurt curd pieces, mineral floc and employs a filter with a pore size >10 μm.

The centrifugation step 28 is an alternative process step to remove visible particulates remaining from the yogurt separation process, e.g. curd pieces, mineral floc, and this additional step may be required if the particulate load is high, so that the fines separation step 26 and the centrifugation step 28 are sequential. Alternatively, the centrifugation step 28 may be omitted. The centrifugation step 28 uses a centrifuge to separate the acid whey into a first liquid phase and a second solid phase comprising particulate material, the first phase having a different density from the second phase, so that a density difference between the phases causes phase separation, and removing the second phase from the first phase. The centrifuge may have a tubular, disc stack or decanter design.

After the centrifugation step 28, the whey is subjected to the microfiltration step 12 and then the ultrafiltration step 14 as described above.

The right-hand process stream 24 in FIG. 5 employs a centrifugation/bactofugation step 30 which uses a centrifuge or a bactofuge to separate the acid whey into a first liquid phase and a second solid phase comprising particulate material, the first phase having a different density from the second phase, so that a density difference between the phases causes phase separation, and removing the second phase from the first phase. The centrifugation/bactofugation is an alternative method to remove visible particulates carried over from the yogurt manufacturing process, e.g. yogurt curd pieces, and in particular is useful if the particulate load is high. The centrifuge or a bactofuge may have a tubular, disc stack or decanter design.

After the centrifugation/bactofugation step 30, the whey is subjected to the microfiltration step 12 and then the ultrafiltration step 14 as described above.

The output of the two process streams 22, 24 is fed to an ultraviolet (UV) radiation treatment step 32, which is after the ultrafiltration step 14 in each process stream 22, 24, to kill active bacteria in the whey. The filtered whey is treated by non-ionizing ultraviolet radiation within a wavelength range of from 220 to 290 nm (UV-C radiation) for maximum bactericidal effect. The degree of inactivation by ultraviolet radiation is directly related to the UV dose applied. The UV-treatment step 32 is carried out to enhance product stability in an ambient temperature supply chain. The UV-treatment step 32 supplements previous microbiological quality control steps, for example the thermization step 6 and the microfiltration step 12.

In the method of FIG. 5, as compared to the methods of FIGS. 1 to 4, the steps of thermization to germinate bacterial spores, fermentation to achieve low pH, for example to pH<4.0, and enzyme treatment to achieve lactose hydrolysis are not carried out prior to the microfiltration and ultrafiltration steps. Instead, a UV-treatment is carried out after the ultrafiltration step to ensure bacterial stability in an ambient temperature supply chain.

In filling step 16, the resultant treated Greek yogurt acid whey composition is then filled into a suitable bulk container for storage and transportation. Finally, in a formulation step 18 the composition is formulated into a beverage base. The composition is a beverage base or beverage component having a cloudy or turbid appearance and a solids content derived from the Greek yogurt acid whey of from 5.5 to 6 wt % based on the weight of the composition. The composition can be combined with other ingredients to make a consumable composition.

Figure 6:
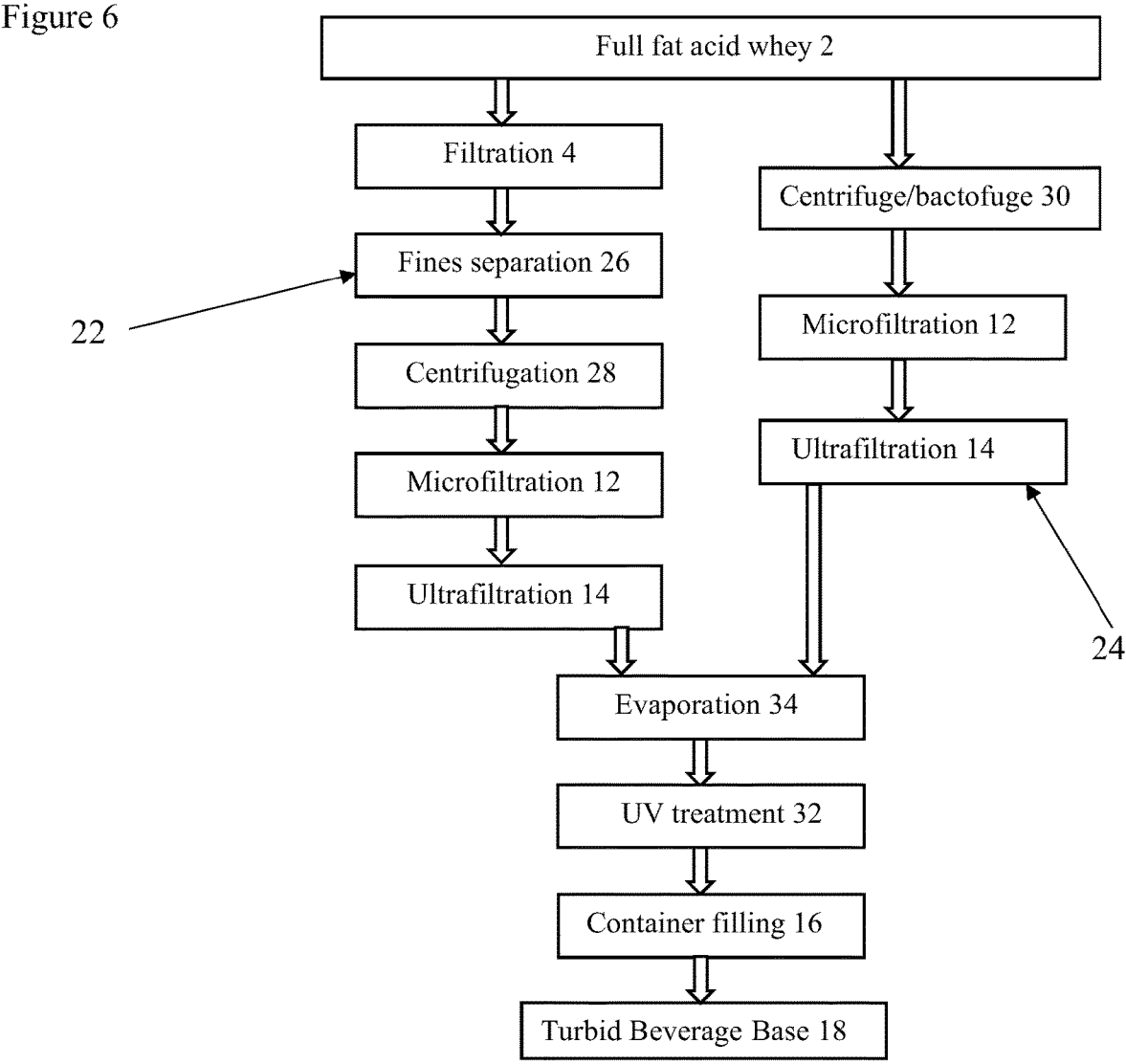
FIG. 6 is a process flow of a method of producing a beverage base or a component for a beverage in accordance with a sixth embodiment of the present invention.

Referring to FIG. 6, there is shown a process flow of a method of producing a beverage base or a component for a beverage in accordance with a sixth embodiment of the present invention.

This method is similar to that of FIG. 5, and the same steps are indicated by the same reference numerals, but the method produces a composition with a higher solids content as a result of additionally employing a concentration step in the process flow.

In particular, after the ultrafiltration step 14 in each process stream 22, 24, and before the UV-treatment step 32, there is additionally provided a concentrating step which is an evaporation step 34. The output of the two process streams 22, 24 is fed to the evaporation step 34, which is after the ultrafiltration step 14 in each process stream 22, 24. The evaporation step 34 concentrates the whey to a total solids content of from 20 to 40 wt % based on the total weight of the whey, Again, the whey may be concentrated to a total solids content of from 25 to 35 wt %, optionally about 30 wt %, based on the total weight of the whey. The evaporation step 34 is typically carried out by mechanical vapour recompression in a multi-effect evaporator at a temperature of up to 75° C., the pressure being set to achieve the desired evaporation temperature. The final concentrate has a total solids content as required by the beverage application. The evaporation step 34 is an alternative concentration step to the reverse osmosis employed in the methods of FIGS. 2 and 4.

The output of the evaporation step 34 is fed to the UV-treatment step 32. In filling step 16, the resultant treated Greek yogurt acid whey composition is then filled into a suitable bulk container for storage and transportation. Finally, in a formulation step 18 the composition is formulated into a beverage base. The composition is a beverage base or beverage component having a cloudy or turbid appearance and a solids content derived from the Greek yogurt acid whey of from 20 to 40 wt %, optionally from 25 to 35 wt %, further optionally about 30 wt %, based on the total weight of the composition. The composition can be combined with other ingredients to make a consumable composition.

Figure 7:
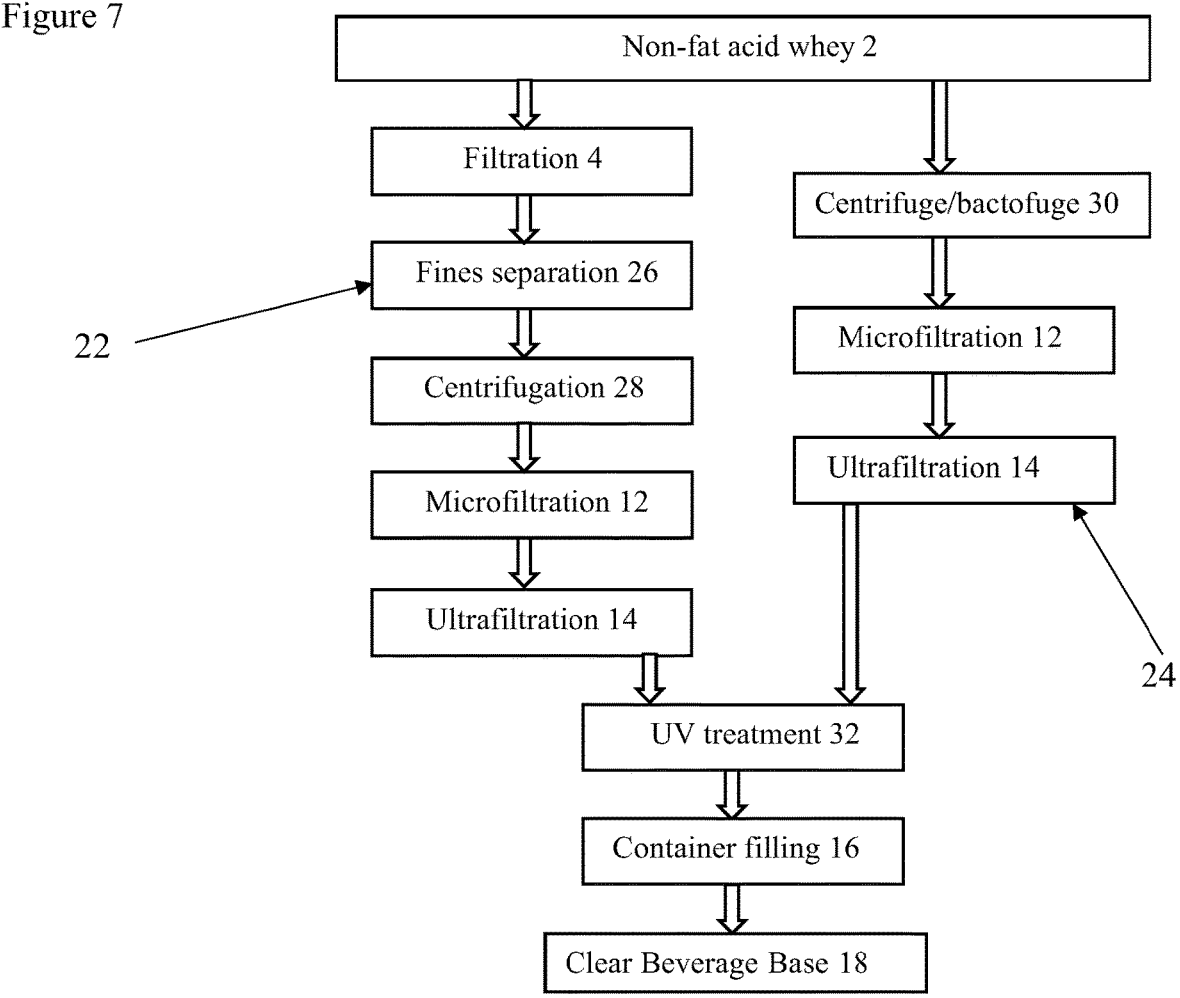
FIG. 7 is a process flow of a method of producing a beverage base or a component for a beverage in accordance with a seventh embodiment of the present invention.

Referring to FIG. 7, there is shown a process flow of a method of producing a beverage base or a component for a beverage in accordance with a seventh embodiment of the present invention.

This method is similar to that of FIG. 5, and the same steps are indicated by the same reference numerals, but the method produces a clear beverage base composition as a result of initially providing a reduced-fat or non-fat Greek yogurt acid whey, as described above. The composition is a beverage base or beverage component having a clear appearance and a solids content derived from the Greek yogurt acid whey of from 5.5 to 6 wt % based on the weight of the composition. The composition can be combined with other ingredients to make a consumable composition.

Figure 8:
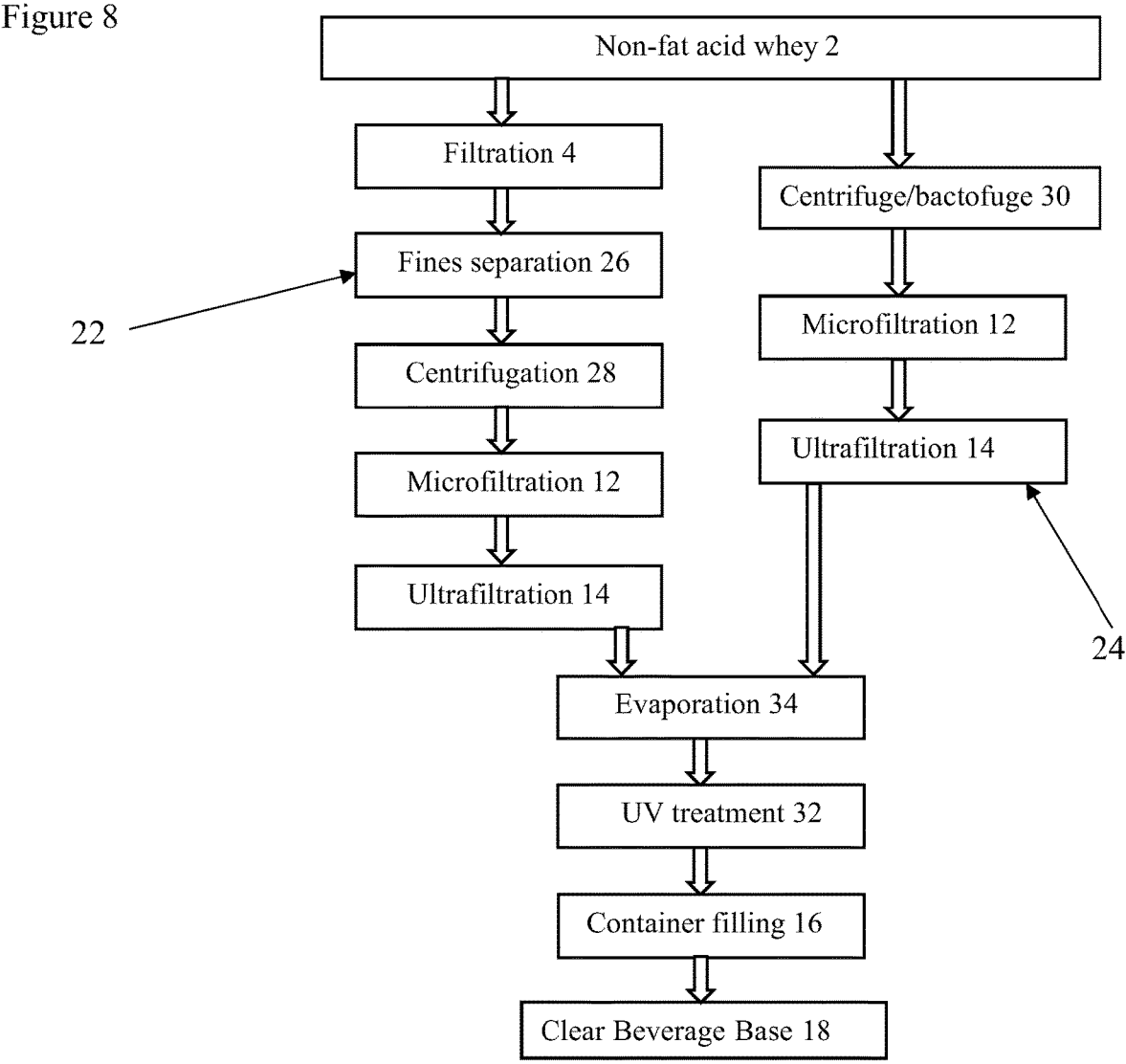
FIG. 8 is a process flow of a method of producing a beverage base or a component for a beverage in accordance with an eighth embodiment of the present invention.

Referring to FIG. 8, there is shown a process flow of a method of producing a beverage base or a component for a beverage in accordance with an eighth embodiment of the present invention.

This method is similar to that of FIG. 6, and the same steps are indicated by the same reference numerals, but the method produces a clear beverage base composition as a result of initially providing a reduced-fat or non-fat Greek yogurt acid whey. The composition is a beverage base or beverage component having a clear appearance and a solids content derived from the Greek yogurt acid whey of most typically about 30 wt % based on the weight of the composition. The composition can be combined with other ingredients to make a consumable composition.

The present invention is now further described with reference to the following non-limiting Examples, which use standardised and stabilized Greek yogurt acid whey in various beverage product applications:

Example 1

Using the method of any of the embodiments of the present invention as described above, a hydration beverage, with lactic taste profile, high in electrolytes (dairy minerals) was formed.

The hydration beverage contained from 1 to 65 wt % acid whey, based on the total weight of the beverage. Two samples were prepared, the first containing being a "single strength" beverage base which comprised up to 6 wt % total solids and in which the acid whey had not been subjected to a concentration step, and the second comprising up to 8.5 wt % concentrated acid whey, to provide 30 wt % total solids in the beverage base.

The beverage may contain added no added sugar, or added sugar up to 8 g/100 ml. Alternatively, the beverage may contain added sugar to provide a sugar content in the aqueous solution of up to 10 Brix.

The beverage may contain added natural coloring agents.

The beverage may be stabilized using pectin or gums or combinations of pectin and gum. The beverage may also be stabilized with antioxidants and acidity regulators.

The beverage was shelf-stable, under ambient conditions, or may be refrigerated.

The beverage was packaged using a hot-filling process (extended shelf-life (ESL)) into an aseptic container.

Example 2

Using the method of any of the embodiments of the present invention as described above, a whey juice beverage was formed.

The whey juice beverage contained from 1 to 50 wt % acid whey, based on the total weight of the beverage. Two samples were prepared, the first containing being a "single strength" beverage base which comprised up to 6 wt % total solids and in which the acid whey had not been subjected to a concentration step, and the second comprising up to 8.5 wt % concentrated acid whey, to provide 30 wt % total solids in the beverage base.

The beverage may contain 100% fruit juice (or combinations of fruit juices) from 1 to 50 wt % added as single strength juice or fruit preparation or concentrates.

The beverage may contain added no added sugar, or added sugar up to 8 g/100 ml. Alternatively, the beverage may contain added sugar to provide a sugar content in the aqueous solution of up to 10 Brix.

The beverage may contain added natural coloring agents.

The beverage may be stabilized using pectin or gums or combinations of pectin and gum. The beverage may also be stabilized with antioxidants and acidity regulators.

The beverage was shelf-stable, under ambient conditions, or may be refrigerated.

The beverage was packaged using a hot-filling process (extended shelf-life (ESL)) into an aseptic container.

Example 3

Using the method of any of the embodiments of the present invention as described above, a water-like beverage was formed.

The water-like beverage contained from 1 to 50 wt % acid whey, based on the total weight of the beverage. Two samples were prepared, the first containing being a "single strength" beverage base which comprised up to 6 wt % total solids and in which the acid whey had not been subjected to a concentration step, and the second comprising up to 8.5 wt % concentrated acid whey, to provide 30 wt % total solids in the beverage base.

The beverage may contain no added sugar, in which case the beverage contains 1-20 kcal/8 fluid ounce serving. Alternatively, the beverage may contain added sugar to provide a sugar content in the aqueous solution of up to 10 Brix.

The beverage contained added protein, to provide up to 15 wt % protein in the beverage formula.

The beverage was shelf-stable, under ambient conditions, or may be refrigerated.

The beverage was packaged using a hot-filling process, to provide an extended shelf-life (ESL) packaging, into an aseptic container.

Example 4

Using the method of any of the embodiments of the present invention as described above, a carbonated or sparkling beverage was formed.

The carbonated beverage contained from 1 to 40 wt % acid whey, based on the total weight of the beverage. Two samples were prepared, the first containing being a "single strength" beverage base which comprised up to 6 wt % total solids and in which the acid whey had not been subjected to a concentration step, and the second comprising up to 6.67 wt % concentrated acid whey, to provide 30 wt % total solids in the beverage base.

The beverage may contain no added sugar, in which case the beverage contains 1-20 kcal/8 fluid ounce serving. Alternatively, the beverage may contain added sugar to provide a sugar content in the aqueous solution of up to 10 Brix.

The beverage contained added protein, to provide up to 15 wt % protein in the beverage formula.

The beverage was shelf-stable, under ambient conditions, or may be refrigerated.

The beverage was tunnel-pasteurized and packaged using a hot-filling process into an aseptic container.

Example 5

Using the method of any of the embodiments of the present invention as described above, a fruit smoothie beverage was formed.

The fruit smoothie beverage contained from 1 to 25 wt % acid whey, based on the total weight of the beverage. The beverage base was a "single strength" beverage base which comprised up to 6 wt % total solids and in which the acid whey had not been subjected to a concentration step.

The beverage further contained up to 20 wt % fruit juice, based on the total weight of the beverage. The fruit may be selected from any known fruit, such as citrus (orange, lemon, lime, grapefruit, etc.), pome (apple, pear, etc.), berry (strawberry, raspberry, etc.), melon, grape, etc.

The beverage contained added sugar to provide a sugar content in the aqueous solution of up to 10 Brix.

The beverage contained added protein, to provide up to 15 wt % protein in the beverage formula.

The beverage further contained one or more hydrocolloids as stabilizers, for example up to 1.5 wt % pectin, microcrystalline cellulose (MCC) and/or carboxy methyl cellulose (CMC), 0.1 wt % gellan gum and/or xanthan gum, up to 3 wt % potato starch, and up to 5 wt % fruit pomace. The beverage had a viscosity of up to 200 cps measured at ambient conditions (21° C.).

The beverage was stable, under refrigeration conditions.

Example 6

Using the method of any of the embodiments of the present invention as described above, the base formed can be used in savory and seasoning applications as a salt (sodium) reduction tool. The high mineral content of the base, can be incorporated in liquid savory or seasoning applications allowing reduction of added salt (sodium) while maintaining target taste profiles. The base can function as a salt (sodium) reduction tool in isolation, or in combination with Flavors with Modifying Properties (FMPs) or mouth feel flavors.

Example 7

Using the method of any of the embodiments of the present invention as described above, the base can be used to stabilize puddings and gels. The high mineral content of the base acts as a stabilizer in combination with higher gum concentrations, to achieve semi-solid to solid structures.

Various embodiments of the claimed invention include, but are not limited to, the following:

A method of producing a beverage base or a component for a beverage or a food, the method comprising the steps of:

a. providing Greek yogurt acid whey which has been obtained by separating the whey from Greek yogurt during a manufacturing process for the Greek yogurt;

b. removing from the acid whey particulate material having a particle size of greater than 10 μm;

c. filtering the whey, directly or indirectly obtained from step b, to remove from the whey any bacteria and germinated bacterial spores therein having a molecular mass of at least 10,000 Daltons, the filtering being through a filter having a pore size of no greater than 1 μm; and d. filtering the whey, directly or indirectly obtained from step c, to remove from the whey any enzymes therein having a molecular mass of at least 1,000 Daltons, the filtering being through a filter having a pore size of no greater than 0.1 μm.

A method according to claim 1 wherein step b is carried out by filtering the whey through a filter.

A method according to claim 1 wherein step b is carried out by a separating the acid whey into a first liquid phase and a second solid phase comprising the particulate material, the first phase having a different density from the second phase, so that a density difference between the phases causes phase separation, and removing the second phase from the first phase.

A method according to claim 1 wherein step b is carried out by a centrifuge or a bactofuge.

A method according to any one of claims 1 to 4 further comprising the step, after step b and before step c, of step e: heat treating the whey to germinate bacterial spores in the whey, and wherein the germinated bacterial spores are removed by filtration in step c.

A method according to claim 5 wherein the heat treatment heats the whey to a temperature of from 25 to 65° C. for a period of from 1 to 10 seconds.

A method according to claim 5 wherein the heat treatment additionally pasteurises the whey.

A method according to any one of claims 1 to 7 further comprising the step, after step b and before step c, of step f: fermenting the whey, the fermented whey having a pH of less than 4.0, optionally wherein the whey has a pH prior to fermentation within the range of from 4.2 to 4.5.

A method according to claim 8 when appendant on claim 5 or any claim appendant on claim 5, wherein the fermenting step f is after heat treating step e.

A method according to claim 8 or claim 9 wherein in the fermenting step f a yogurt and/or cheese culture is added to the whey as a fermentation agent.

A method according to claim 10 wherein in the fermenting step f the fermentation agent comprises at least one bacterium selected from *lactobacillus* and *Streptococcus thermophilus*.

A method according to any one of claims 1 to 11 further comprising the step, after step b and before step c, of step g: enzymatically treating the whey with a lactaze enzyme to hydrolyse lactose to glucose and galactose.

A method according to claim 12 wherein the enzymatic treatment step g is carried out at temperature of from 21 to 45° C.

A method according to any one of claims 1 to 13 for forming a beverage base having a total solids content of from 5.5 to 6 wt % based on the total weight of the beverage base, the method comprising the steps of:
a. providing Greek yogurt acid whey which has been obtained by separating the whey from Greek yogurt during a manufacturing process for the Greek yogurt;
b. after step a, removing from the acid whey particulate material having a particle size of greater than 10 μm;
after step b, heat treating the whey to germinate bacterial spores in the whey;
after step e, fermenting the whey, the fermented whey having a pH of less than 4.0, optionally wherein the whey has a pH prior to fermentation within the range of from 4.2 to 4.5;
after step f, enzymatically treating the whey with a lactaze enzyme to hydrolyse lactose to glucose and/or galactose;
after step g, filtering the whey to remove from the whey any bacteria and germinated bacterial spores therein having a molecular mass of at least 10,000 Daltons, the germinated bacterial spores being produced in step e, the filtering being through a filter having a pore size of no greater than 1 μm; and
after step c, filtering the whey to remove from the whey any enzymes therein having a molecular mass of at least 1,000 Daltons, the filtering being through a filter having a pore size of no greater than 0.1 μm.

A method according to any one of claims 1 to 13 further comprising the step h, after step b, of concentrating the whey to a total solids content of from 20 to 40 wt % based on the total weight of the whey.

A method according to claim 15 wherein in step h the whey is concentrated to a total solids content of from 25 to 35 wt %, optionally about 30 wt %, based on the total weight of the whey.

A method according to claim 15 or claim 16 wherein step h comprises a reverse osmosis treatment through a semi-permeable membrane.

A method according to claim 17 wherein the semi-permeable membrane has a pore size of less than 0.001 μm.

A method according to claim 17 or claim 18 for forming a beverage base having a total solids content of from 20 to 40 wt % based on the total weight of the beverage base, the method comprising the steps of:
c. providing Greek yogurt acid whey which has been obtained by separating the whey from Greek yogurt during a manufacturing process for the Greek yogurt;
d. after step a, removing from the acid whey particulate material having a particle size of greater than 10 μm;
e. e. after step b, heat treating the whey to germinate bacterial spores in the whey;
f. h. after step e, concentrating the whey to a total solids content of from 20 to 40 wt % based on the total weight of the whey by a reverse osmosis treatment through a semi-permeable membrane;
g. after step h, fermenting the whey, the fermented whey having a pH of less than 4, optionally wherein the whey has a pH prior to fermentation within the range of from 4.2 to 4.5;
h. after step f, enzymatically treating the whey with a lactose enzyme to hydrolyse lactose to glucose and/or galactose;
i. c. after step g, filtering the whey to remove from the whey any bacteria and germinated bacterial spores therein having a molecular mass of at least 10,000 Daltons, the germinated bacterial spores being produced in step e, the filtering being through a filter having a pore size of no greater than 1 μm; and
j. d. filtering the whey, directly or indirectly obtained from step c, to remove from the whey any enzymes therein having a molecular mass of at least 1,000 Daltons, the filtering being through a filter having a pore size of no greater than 0.1 μm.

A method according to claim 19 wherein in step h the whey is concentrated to a total solids content of from 25 to 35 wt %, optionally about 30 wt %, based on the total weight of the whey.

A method according to claim 15 wherein step h, of concentrating the whey to a total solids content of from 20 to 40 wt % based on the total weight of the whey, is after step d.

A method according to claim 21 wherein in step h the whey is concentrated to a total solids content of from 25 to 35 wt %, optionally about 30 wt %, based on the total weight of the whey.

A method according to claim 21 or claim 22 wherein step h comprises an evaporation step.

A method according to claim 23 wherein the evaporation step is carried out by mechanical vapour recompression at a temperature of up to 75° C.

A method according to claim 23 or claim 24 for forming a beverage base having a total solids content of from 20 to 40 wt % based on the total weight of the beverage base, the method comprising the steps of:
k. providing Greek yogurt acid whey which has been obtained by separating the whey from Greek yogurt during a manufacturing process for the Greek yogurt;
l. after step a, removing from the acid whey particulate material having a particle size of greater than 10 μm by filtering and/or centrifugation;
m. after step b, filtering the whey to remove from the whey any bacteria and germinated bacterial spores therein having a molecular mass of at least 10,000 Daltons, the filtering being through a filter having a pore size of no greater than 1 μm;
n. after step c, filtering the whey to remove from the whey any enzymes therein having a molecular mass of at least 1,000 Daltons, the filtering being through a filter having a pore size of no greater than 0.1 µm; and o. h after step d, concentrating the whey by evaporation to a total solids content of from 20 to 40 wt % based on the total weight of the beverage.

A method according to claim 25 wherein in step h the whey is concentrated so that the total solids content of the beverage is from 25 to 35 wt %, optionally about 30 wt %, based on the total weight of the beverage.

A method according to any one of claims 1 to 26 wherein the Greek yogurt acid whey provided in step a is a full fat Greek yogurt acid whey and the beverage is turbid.

A method according to claim 27 wherein the Greek yogurt acid whey provided in step a has a fat concentration of from 0.05 to 0.1 wt % based on the total weight of the Greek yogurt acid whey.

A method according to any one of claims 1 to 26 wherein the Greek yogurt acid whey provided in step a is a reduced-fat or non-fat Greek yogurt acid whey and the beverage is clear.

A method according to claim 29 wherein the Greek yogurt acid whey provided in step a has a fat concentration of from 0 to 0.04 wt %, or from greater than 0 to up to 0.04 wt %, based on the total weight of the Greek yogurt acid whey.

A method according to any one of claims 1 to 30 further comprising the step i, after step d, of treating the filtered whey by ultraviolet radiation within a wavelength range of from 220 to 290 nm.

A beverage base or a component for a beverage or a food produced by the method of any one of claims 1 to 31.

What is claimed is:

1. A method of producing a beverage base or a component for a beverage or a food, the method comprising the steps of:
   a. providing Greek yogurt acid whey which has been obtained by separating the whey from Greek yogurt during a manufacturing process for the Greek yogurt;
   b. removing from the acid whey particulate material having a particle size of greater than 10 µm;
   c. filtering the whey, directly or indirectly obtained from step b, to remove from the whey any bacteria and germinated bacterial spores therein having a molecular mass of at least 10,000 Daltons, the filtering being through a filter having a pore size of no greater than 1 µm; and
   d. filtering the whey, directly or indirectly obtained from step c, to remove from the whey any enzymes therein having a molecular mass of at least 1,000 Daltons, the filtering being through a filter having a pore size of no greater than 0.1 µm.

2. A method according to claim 1 wherein step b is carried out by filtering the whey through a filter.

3. A method according to claim 1 wherein step b is carried out by a separating the acid whey into a first liquid phase and a second solid phase comprising the particulate material, the first phase having a different density from the second phase, so that a density difference between the phases causes phase separation, and removing the second phase from the first phase.

4. A method according to claim 1 wherein step b is carried out by a centrifuge or a bactofuge.

5. A method according to claim 1 further comprising the step, after step b and before step c, of step e: heat treating the whey to germinate bacterial spores in the whey, and wherein the germinated bacterial spores are removed by filtration in step c.

6. A method according to claim 5 wherein the heat treatment heats the whey to a temperature of from 25 to 65° C. for a period of from 1 to 10 seconds.

7. A method according to claim 5 wherein the heat treatment additionally pasteurises the whey.

8. A method according to claim 1 further comprising the step, after step b and before step c, of step f: fermenting the whey, the fermented whey having a pH of less than 4.0.

9. A method according to claim 8 wherein the whey has a pH prior to fermentation within the range of from 4.2 to 4.5.

10. A method according to claim 8 further comprising the step, after step b and before step c, of step e: heat treating the whey to germinate bacterial spores in the whey, and wherein the germinated bacterial spores are removed by filtration in step, and wherein the fermenting step f is after heat treating step e.

11. A method according to claim 8 wherein in the fermenting step f a yogurt and/or cheese culture is added to the whey as a fermentation agent.

12. A method according to claim 11 wherein in the fermenting step f the fermentation agent comprises at least one bacterium selected from *lactobacillus* and *Streptococcus thermophilus*.

13. A method according to claim 1 further comprising the step, after step b and before step c, of step g: enzymatically treating the whey with a lactaze enzyme to hydrolyse lactose to glucose and galactose.

14. A method according to claim 13 wherein the enzymatic treatment step g is carried out at temperature of from 21 to 45° C.

15. A method for forming a beverage base having a total solids content of from 5.5 to 6 wt % based on the total weight of the beverage base, the method comprising the steps of:
   a. providing Greek yogurt acid whey which has been obtained by separating the whey from Greek yogurt during a manufacturing process for the Greek yogurt;
   b. after step a, removing from the acid whey particulate material having a particle size of greater than 10 µm;
   c. after step b, heat treating the whey to germinate bacterial spores in the whey;
   d. after step c, fermenting the whey, the fermented whey having a pH of less than 4.0;
   e. after step d, enzymatically treating the whey with a lactaze enzyme to hydrolyse lactose to glucose and/or galactose;
   f. after step e, filtering the whey to remove from the whey any bacteria and germinated bacterial spores therein having a molecular mass of at least 10,000 Daltons, the germinated bacterial spores being produced in step e, the filtering being through a filter having a pore size of no greater than 1 µm; and
   g. after step f, filtering the whey to remove from the whey any enzymes therein having a molecular mass of at least 1,000 Daltons, the filtering being through a filter having a pore size of no greater than 0.1 µm.

16. A method according to claim 15 wherein the whey has a pH prior to fermentation within the range of from 4.2 to 4.5.

17. A method according to claim 1 further comprising the step h, after step b, of concentrating the whey to a total solids content of from 20 to 40 wt % based on the total weight of the whey.

18. A method according to claim 17 wherein in step h the whey is concentrated to a total solids content of from 25 to 35 wt % based on the total weight of the whey.

19. A method according to claim 17 wherein step h comprises a reverse osmosis treatment through a semi-permeable membrane.

20. A method according to claim 19 wherein the semi-permeable membrane has a pore size of less than 0.001 µm.

21. A method for forming a beverage base having a total solids content of from 20 to 40 wt % based on the total weight of the beverage base, the method comprising the steps of:
   a. providing Greek yogurt acid whey which has been obtained by separating the whey from Greek yogurt during a manufacturing process for the Greek yogurt;
   b. after step a, removing from the acid whey particulate material having a particle size of greater than 10 µm;
   c. after step b, heat treating the whey to germinate bacterial spores in the whey;
   d. after step c, concentrating the whey to a total solids content of from 20 to 40 wt % based on the total weight of the whey by a reverse osmosis treatment through a semi-permeable membrane;
   e. after step d, fermenting the whey, the fermented whey having a pH of less than 4;
   f. after step e, enzymatically treating the whey with a lactose enzyme to hydrolyse lactose to glucose and/or galactose;
   g. after step f, filtering the whey to remove from the whey any bacteria and germinated bacterial spores therein having a molecular mass of at least 10,000 Daltons, the germinated bacterial spores being produced in step e, the filtering being through a filter having a pore size of no greater than 1 µm; and
   h. filtering the whey, directly or indirectly obtained from step c, to remove from the whey any enzymes therein having a molecular mass of at least 1,000 Daltons, the filtering being through a filter having a pore size of no greater than 0.1 µm.

22. A method according to claim 21 wherein the whey has a pH prior to fermentation within the range of from 4.2 to 4.5.

23. A method according to claim 21 wherein in step d the whey is concentrated to a total solids content of from 25 to 35 wt % based on the total weight of the whey.

24. A method according to claim 17 wherein step d, of concentrating the whey to a total solids content of from 20 to 40 wt % based on the total weight of the whey, is after step h.

25. A method according to claim 24 wherein in step d the whey is concentrated to a total solids content of from 25 to 35 wt % based on the total weight of the whey.

26. A method according to claim 24 wherein step d comprises an evaporation step.

27. A method according to claim 26 wherein the evaporation step is carried out by mechanical vapour recompression at a temperature of up to 75° C.

28. A method for forming a beverage base having a total solids content of from 20 to 40 wt % based on the total weight of the beverage base, the method comprising the steps of:
   a. providing Greek yogurt acid whey which has been obtained by separating the whey from Greek yogurt during a manufacturing process for the Greek yogurt;
   b. after step a, removing from the acid whey particulate material having a particle size of greater than 10 µm by filtering and/or centrifugation;
   c. after step b, filtering the whey to remove from the whey any bacteria and germinated bacterial spores therein having a molecular mass of at least 10,000 Daltons, the filtering being through a filter having a pore size of no greater than 1 µm;
   d. after step c, filtering the whey to remove from the whey any enzymes therein having a molecular mass of at least 1,000 Daltons, the filtering being through a filter having a pore size of no greater than 0.1 µm; and
   e after step d, concentrating the whey by evaporation to a total solids content of from 20 to 40 wt % based on the total weight of the beverage.

29. A method according to claim 28 wherein in step e the whey is concentrated so that the total solids content of the beverage is from 25 to 35 wt % based on the total weight of the beverage.

30. A method according to claim 1 wherein the Greek yogurt acid whey provided in step a is a full fat Greek yogurt acid whey and the beverage is turbid.

31. A method according to claim 30 wherein the Greek yogurt acid whey provided in step a has a fat concentration of from 0.05 to 0.1 wt % based on the total weight of the Greek yogurt acid whey.

32. A method according to claim 1 wherein the Greek yogurt acid whey provided in step a is a reduced-fat or non-fat Greek yogurt acid whey and the beverage is clear.

33. A method according to claim 32 wherein the Greek yogurt acid whey provided in step a has a fat concentration of from 0 to 0.04 wt %, or from greater than 0 to up to 0.04 wt %, based on the total weight of the Greek yogurt acid whey.

34. A method according to claim 1 further comprising the step f, after step d, of treating the filtered whey by ultraviolet radiation within a wavelength range of from 220 to 290 nm.

* * * * *